(12) United States Patent
Gustavsson

(10) Patent No.: US 9,366,311 B2
(45) Date of Patent: Jun. 14, 2016

(54) DEVICE FOR DAMPING VIBRATIONS AND METHOD FOR ASSEMBLING THE DEVICE

(75) Inventor: Bengt-Göran Gustavsson, Bredaryd (SE)

(73) Assignee: TRELLEBORG AUTOMOTIVE FORSHEDA AB, Trelleborg (SE)

( * ) Notice: Subject to any disclaimer, the term of this patent is extended or adjusted under 35 U.S.C. 154(b) by 876 days.

(21) Appl. No.: 11/808,654

(22) Filed: Jun. 12, 2007

(65) Prior Publication Data

US 2007/0240951 A1    Oct. 18, 2007

Related U.S. Application Data

(63) Continuation of application No. 10/297,125, filed as application No. PCT/SE01/01248 on Jun. 1, 2001, now Pat. No. 7,246,797.

(30) Foreign Application Priority Data

Jun. 2, 2000   (SE) ........................................ 0002060

(51) Int. Cl.
*F16F 7/108*   (2006.01)
*F16F 15/08*   (2006.01)
*F16F 1/371*   (2006.01)

(52) U.S. Cl.
CPC ............... *F16F 15/08* (2013.01); *F16F 1/3713* (2013.01); *F16F 7/108* (2013.01)

(58) Field of Classification Search
USPC .......... 267/141, 136, 292, 152, 153; 188/378, 188/379, 380; 248/560, 632, 634
See application file for complete search history.

(56) References Cited

U.S. PATENT DOCUMENTS

| | | | | |
|---|---|---|---|---|
| 1,969,266 A | * | 8/1934 | Herold | 248/346.11 |
| 2,442,754 A |   | 6/1948 | Beam | |
| 2,951,674 A | * | 9/1960 | Rice | 267/141.4 |
| 3,110,553 A | * | 11/1963 | Kniffin, Jr. | 264/230 |
| 3,115,225 A | * | 12/1963 | Fraylick et al. | 52/716.7 |
| 3,250,565 A | * | 5/1966 | Jaskowiak | 296/35.1 |
| 3,319,918 A | * | 5/1967 | Rapata | 248/239 |
| 3,350,042 A | * | 10/1967 | Stewart et al. | 267/141.4 |
| 3,368,806 A | * | 2/1968 | Szonn | 267/153 |
| 4,405,272 A | * | 9/1983 | Wollar | 411/41 |
| 4,442,367 A | * | 4/1984 | Suzuki | 310/91 |
| 4,579,473 A | * | 4/1986 | Brugger | 403/163 |

(Continued)

FOREIGN PATENT DOCUMENTS

DE    3925761    2/1990
DE    197 52 188 A1    6/1998

(Continued)

*Primary Examiner* — Robert A Siconolfi
*Assistant Examiner* — James Hsiao
(74) *Attorney, Agent, or Firm* — Birch, Stewart, Kolasch & Birch, LLP

(57) ABSTRACT

Device for damping vibrations of a vibration surface (21) of the frequency tuned resonance damping kind consisting of one or several elastic damping elements (1-4) and a vibration body (5) supported by the damping elements which together are tuned to damp the vibrations of said surface within a selected frequency range. First mutually co-operating form grip organs give a form grip between said damping elements (1-4) and the vibration surface (21), and second mutually co-operating form grip organs give a form grip between the damping elements and the vibration body. The form grip organs in addition have a recess with gripping surfaces (25-30, 33-35) for transferring vibrations.

25 Claims, 14 Drawing Sheets

(56) References Cited

U.S. PATENT DOCUMENTS

| | | | |
|---|---|---|---|
| 4,697,781 A | 10/1987 | Hamano et al. | |
| 4,880,077 A * | 11/1989 | Verse et al. | 181/207 |
| 5,024,464 A | 6/1991 | Kawaguchi et al. | |
| 5,046,566 A | 9/1991 | Dorner et al. | |
| 5,180,147 A | 1/1993 | Andersson et al. | |
| 5,316,423 A * | 5/1994 | Kin | 411/510 |
| 5,339,491 A * | 8/1994 | Sims | 16/2.2 |
| 5,397,206 A | 3/1995 | Sihon | |
| 5,445,365 A | 8/1995 | Fordere | |
| 5,699,865 A * | 12/1997 | Forderer et al. | 173/162.2 |
| 5,765,860 A * | 6/1998 | Osborn et al. | 280/728.2 |
| D412,106 S * | 7/1999 | Kennard, IV | D8/402 |
| 6,024,338 A * | 2/2000 | Koike et al. | 248/638 |
| 6,070,846 A | 6/2000 | Shimokobe et al. | |
| 6,149,183 A * | 11/2000 | Ford | 280/728.2 |
| 6,324,731 B1 * | 12/2001 | Pliml, Jr. | 24/453 |
| 6,351,380 B1 * | 2/2002 | Curlee et al. | 361/695 |
| 6,439,599 B1 | 8/2002 | Laue et al. | |
| 6,894,897 B1 * | 5/2005 | Nagurny et al. | 361/695 |
| 7,246,797 B2 * | 7/2007 | Gustavsson | 267/141.4 |
| 7,384,210 B2 * | 6/2008 | Sura et al. | 403/168 |
| 7,770,266 B2 * | 8/2010 | Higgins et al. | 24/297 |
| 7,786,629 B2 * | 8/2010 | Fukuda et al. | 310/51 |
| 7,828,372 B2 * | 11/2010 | Ellison | 296/191 |
| 7,864,526 B2 * | 1/2011 | Liu | 361/695 |
| 8,215,245 B2 * | 7/2012 | Morrison et al. | 108/91 |
| 8,505,701 B2 * | 8/2013 | Sella et al. | 188/379 |
| 2003/0188941 A1 * | 10/2003 | Davis et al. | 188/379 |
| 2005/0232718 A1 * | 10/2005 | Smith et al. | 409/141 |
| 2007/0120301 A1 * | 5/2007 | Domen et al. | 267/152 |

FOREIGN PATENT DOCUMENTS

| | | | |
|---|---|---|---|
| FR | 2098600 | 3/1972 | |
| GB | 1075262 | 7/1967 | |
| GB | 1517823 | 7/1978 | |
| JP | 05126187 A * | 5/1993 | F16F 1/42 |
| WO | WO 00/15470 | 3/2000 | |

* cited by examiner

DEVICE FOR DAMPING VIBRATIONS AND METHOD FOR ASSEMBLING THE DEVICE

CROSS REFERENCE TO RELATED APPLICATIONS

This U.S. non-provisional application is a Continuation of Ser. No. 10/297,125, filed Jun. 30, 2003 now U.S. Pat. No. 7,246,797 which was the National Stage of International Application No. PCT/SE01/01248, filed Jun. 1, 2001, the content of both of which is incorporated herein in its entirety by reference.

TECHNICAL FIELD

Example embodiments of the present invention relate to a device for damping vibrations.

Example embodiments of the present invention also relate to a method for assembling the device.

BACKGROUND

The vibration damper is of a kind which is called frequency tuned resonance damper for damping resonance vibrations and resonance noise in various structures.

Vibration damping devices of this kind are known, which use an elastically suspended mass or vibration body in order to counteract vibrations in the vibrating surface or body by means of phase shifted movement of the mass. An example of such a vibration damping device is applicant's own invention according to, for example, U.S. Pat. No. 5,180,147 which has very good vibration damping properties, but needs an enveloping holding part in which both the vibration body and the damping elements are enclosed. The holding part needs space, and negatively affects the production cost. Another known technique is to vulcanize the mass to the damping elements, which is a time-consuming and expensive attachment method.

Various vibration isolating elastic elements are also known which exhibit fastening organs for attachment to a fastening plate and attachment to a vibration producing unit, for example an engine or a compressor, but these do not have a separate rotation body which is intended to vibrate with a phase shift relative to the vibration producing body.

SUMMARY

Example embodiments of the present invention obtain a vibration damping device of the frequency tuned resonance damping type, which is simple to produce and assemble, and which, in a simple manner, can be dimensioned for various damping properties.

Example embodiments of the present invention obtain a standard element which can be used for a variety of different applications, which thus gives a cost-efficient solution.

BRIEF DESCRIPTION OF THE FIGURES

Example embodiments will be described with reference to the appended drawings.

EXAMPLE, NON-LIMITING EMBODIMENTS

Figure 1:
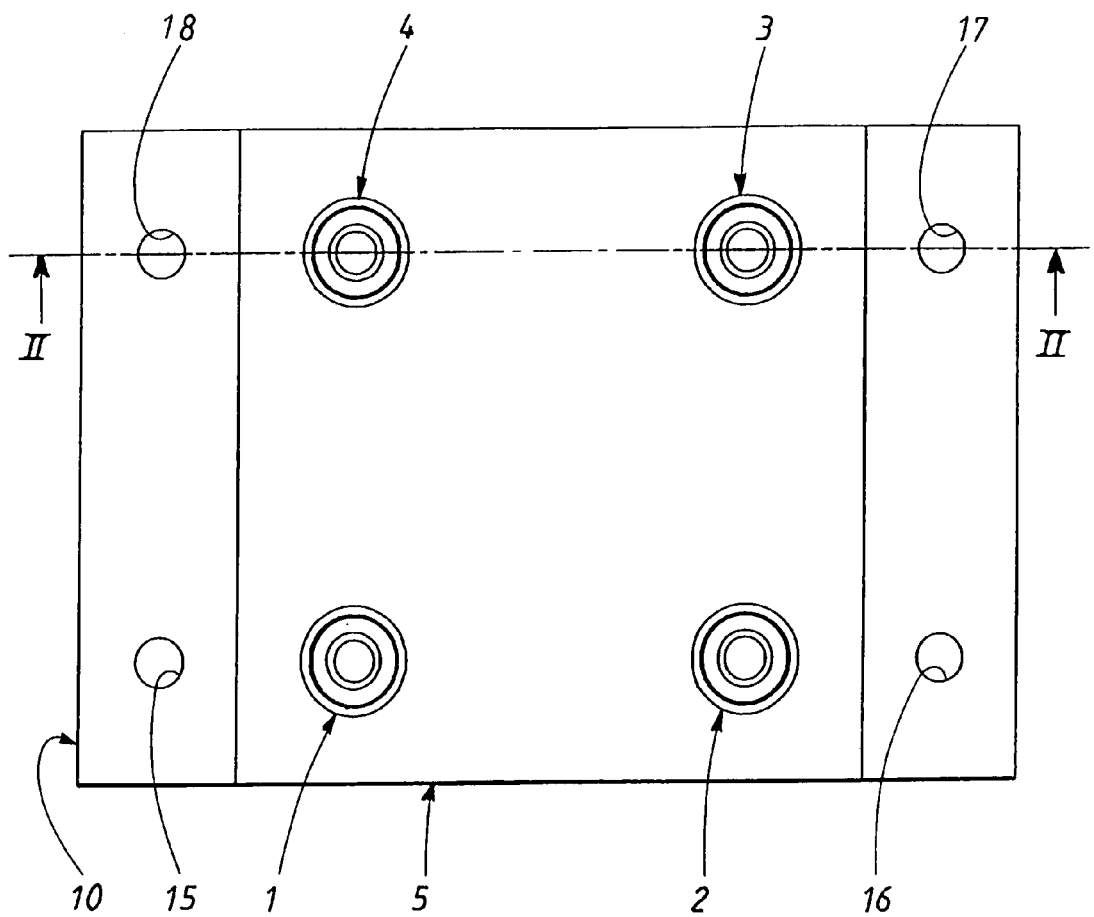
FIG. 1 is a plan view of the resonance damper according to an example, non-limiting embodiment.
Figure 2:
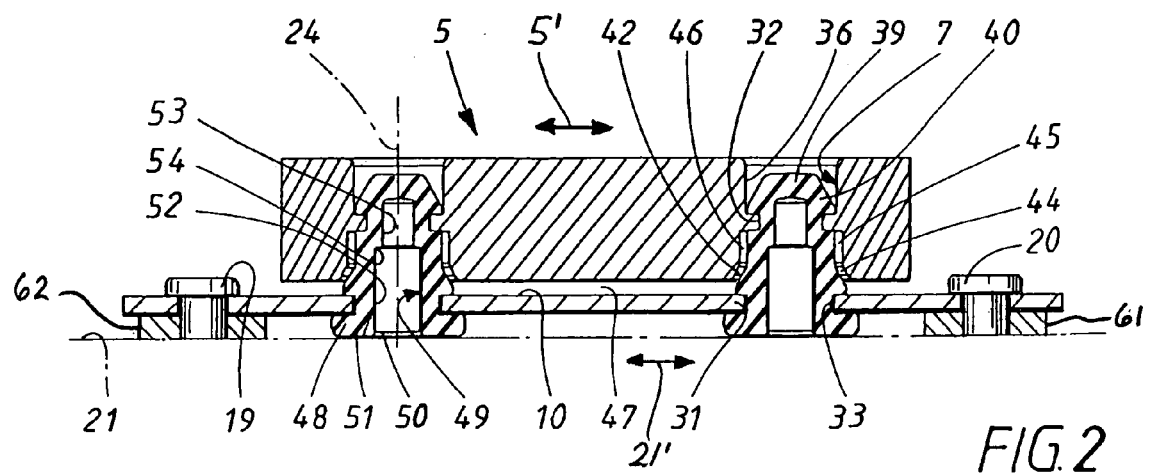
FIG. 2 is a sectional view of the resonance damper taken along the line II-II of FIG. 1.
Figure 3:
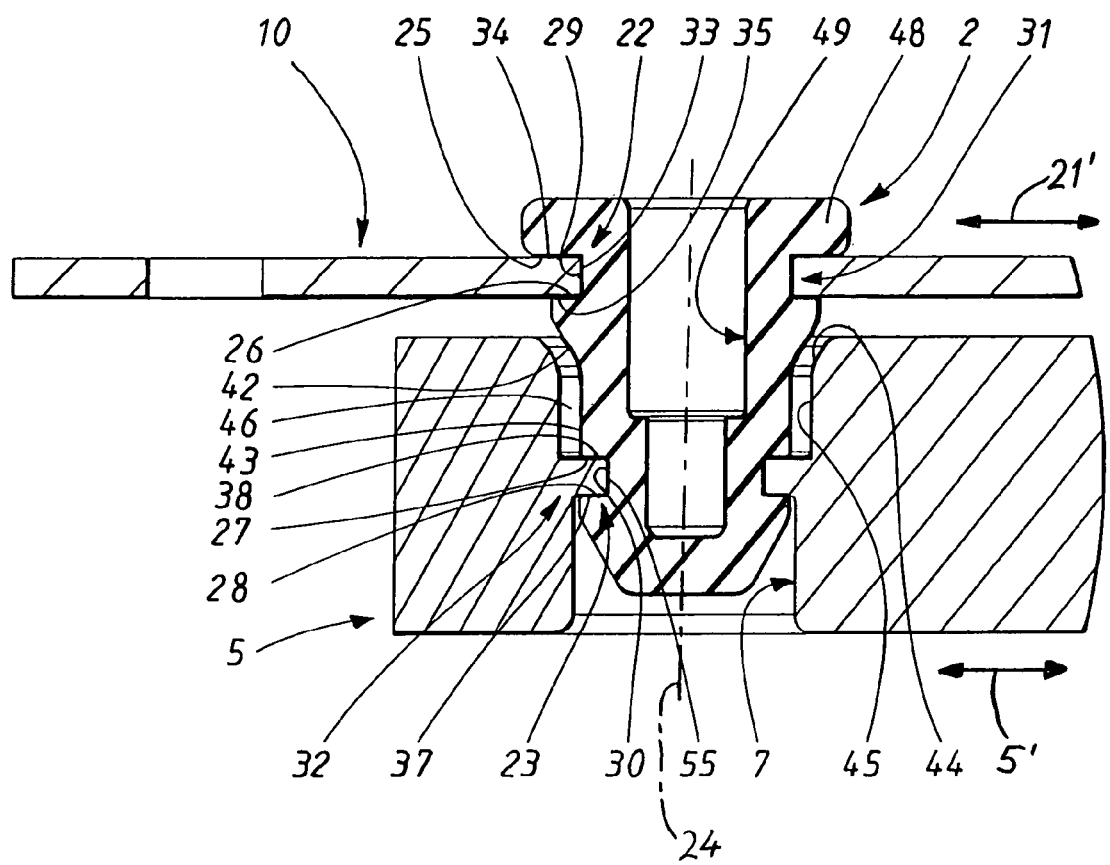
FIG. 3 is an enlarged partial view of the view of FIG. 2.

With reference mainly to FIGS. 1, 2 and 3, the design of the resonance damper according to the invention will be described first. The resonance damper consists of at least two main parts, one or several, in the example shown four elastic damping elements, 1-4 and also a vibration body 5 or mass. The damping elements 1-4 are highly elastic, i.e. designed in a high-grade elastic material, for example natural rubber SBR, silicon rubber, while the vibration body 5 is designed in an essentially inelastic, i.e. very form constant material, with a relatively high density, such as steel or other metal. The vibration body is, in the example shown, designed in a massive, i.e. solid material, and is box-shaped, i.e. shaped as a parallel piped with corners with straight angles, and sides which face each other in pairs and which are mutually parallel. The vibration body can, however, have a completely different shape, and can have a broken structure. The vibration body is equipped with recesses 6, 7, 8, 9, the quantity of which corresponds to the number of damping elements, and are preferably designed as through-going holes or bores which are intended to house parts of the damping elements in a way which will be described in more detail below. In the example shown, the resonance damper comprises a fastening element in the shape of an assembly plate 10 which is also designed with a number of recesses 11-14, which corresponds to the number of damping elements and which, in the example shown, are through-going holes or bores. Apart from the fastening holes for the damping elements 1-14 in the fastening plate, there are fastening holes 15, 16, 17, 18 arranged for, in turn, fastening the fastening plate against the surface which vibrates, which vibrations are to damped, see FIG. 2 which schematically shows fastening elements in the shape of screws 19, 20, and also the fastening surface 21 shown with dotted lines. The fastening plate 10 can however be omitted and replaced by direct assembly onto the vibrating surface, which for example can be a plate, and which is provided with the fastening holes 11-14. The plate can be replaced by cross-going beams which support the vibrating body, or another structure which supports the vibrating body above, at the side or beneath the structure.

The damping elements 1-4 exhibit first holding organs, comprising form grip organs herein called gripping organs 22, for holding the damping element at the vibration surface, in the example shown through the fastening plate 10. In addition, each damping element exhibits second fastening organs comprising form grip organs, here called holding organs 23, for retaining the vibration body at the respective damping element. Both holding organs extend around the damping element, which in the example shown is rotationally symmetrical around its axis of symmetry or longitudinal axis 24. The holding organs 22, 23 form ring-shaped grooves with an essentially U-shaped cross-section, preferably with straight edges which form pairwise facing radially surfaces 25, 26 and 27, 28 respectively, and in each groove there is an essentially cylindrical bottom surface 29, 30. Alternatively, the first retaining organs 22 can be arranged to interact with the vibration body 5, with the second holding organs 23 arranged to interact with the fastening plate 10.

As can be seen in FIGS. 2 and 3, both the fastening element 10 and the vibration body 5 exhibit holding organs 31, 32 arranged to interact between the holding organs 22, 23 of the damping elements for mutually interacting form grip and retaining of the vibration body at the fastening plate, i.e. at the vibrating surface 21. The holding organs 31 of the fastening plate are formed by the circumference edge of the respective holes 11-14, which form both an essentially cylindrical surface 33 intended to contact the bottom surface 29. In the grooves of the damping element, and also to mutually parallel radial surfaces 34, 35 which face away from each other, and which are intended to interact with the edge surfaces 25, 26, which face each other in the groove of the damping element.

In a similar way, a portion of the vibration body 5 in every hole 7 forms a ring-shaped abutment which forms the gripping organ 32 in the form of a flange which abuts from the essentially cylindrical enveloping wall 36 of the hole 7. In so doing, this gripping organ also forms edge surfaces which interact with the edge surfaces 27, 28, 30 of the damping element in the gripping organ 23. Preferably, the ring-shaped flanges 32 of the vibration body are so dimensioned that they completely fill the corresponding gripping organ 23 of the damping element, and thus are dimensioned in the same way. Thus, the flanges 32 of the vibration body exhibit two radial surfaces 37, 38 which face away from each other, and which are in contact with and in interaction with the radial surfaces 27, 28 of the damping elements which face each other, while the ring-shaped concave cylindrical surface 55 of the flange interacts with the corresponding convex cylinder surface, i.e. the bottom surface 30 of the groove in the damping elements.

The damping elements exhibit an essentially conical head 39 with a conical enveloping surface 40, in the shape of a truncated cone which facilitates the assembly of the resonance damper which will be described in more detail below. The formed end surface 41 which in the example shown is plane, but can also be of another shape, should have a cross dimension or diameter which is less than, or at least does not exceed, the cross dimension or diameter of the edges which are to be passed when assembling, that is the holes 11-14 and the abutting flange 32 of the vibration body 5 respectively. For this purpose, the damping elements 1-4 are provided with an additional conical surface 42 with the shape of a truncated cone in a portion between the gripping organs 31 of the fastening plate 10 and the gripping organs 32 of the vibration body. Above the conical surface 42, there is arranged a cylindrical portion 43.

The holes 6-9 in the vibration body also have a conical portion 44 which also transitions into a cylindrical portion 45, but exhibits a slightly larger diameter than the corresponding portions in the damping elements, in order to create an intermediate space 46 which enables essentially radial vibrational movements of the vibration body.

The vibration body is arranged so that it is supported with an intermediate space 47 to the fastening plate 10 in order to permit vibrational movement of the vibration body without strike through, i.e. contact with the fastening plate.

By means of the above described cylindrical and conical intermediate space 46, there is thus created a certain freedom of movement with amplitudes of the vibrations essentially radially relative to the longitudinal axis or the axis of symmetry 24 which normally exceed the dimensions of the intermediate spaces in the corresponding directions. Extreme movements of the vibrational surface, for example chocks in a motor vehicle, will result in the vibration body "touching bottom", resulting in a heavier damping and counteracting of tendencies to large amplitudes which counteracts the risk of direct metal contact between the vibration body and the fastening plate. The tuned vibrational damper is arranged to damp vibrations which are essentially directed parallel to the surface 21 of the source of vibrations, see the double arrow 21', which indicates the main direction of vibration. The damping elements 1-4 are for this purpose arranged with their longitudinal axis 24 across this direction of vibration 21', which can also point into or out of the plane of the paper essentially at straight angles to the longitudinal axis 24. By means of the elasticity of the damping elements 1-4 and the mass of the vibration body 5, this is brought into phase shifted vibrations in the opposite direction and essentially parallel to (see the double arrow 5') the essential direction of vibration, i.e. across or at straight angles to the longitudinal axis 24 of the damping elements. The damping elements 1-4 are thus exposed to skewing, with the vibrational body being so shaped that it normally admits sufficient play for this movement without other direct contact with the damping elements than by means of the holding organs 23, 32.

Inside the fastening plate, the damping elements 1-4 exhibit a foot in the shape of a ring-shaped flange 48, which has a larger diameter than the holes of the fastening plate, and thus has the possibility of shaping the gripping organs 22 of the damping elements in the shape of the ring-shaped recess. In the example shown, the damping elements exhibit an inwards facing cavity 49, which is open towards the foot of the damping elements and thus forms an opening 50 in the base surface 51 of the damping elements, which in the example shown is essentially plane. The cavity 49 in the example shown exhibits an essentially cylindrical shape, and to be more precise, has two cylindrical parties 52, 53 with different diameters. By choice of dimensions of the cross-sectional area of the damping elements 1-4, the damping elements can thus be tuned to the desired frequency range in combination with choice of material in the damping elements in order to obtain the desired vibration damping properties.

The cavities 49 can during or after assembly be filled with a tuning core 65 of a desired material in order to thus effect the damping properties.

Figure 4:
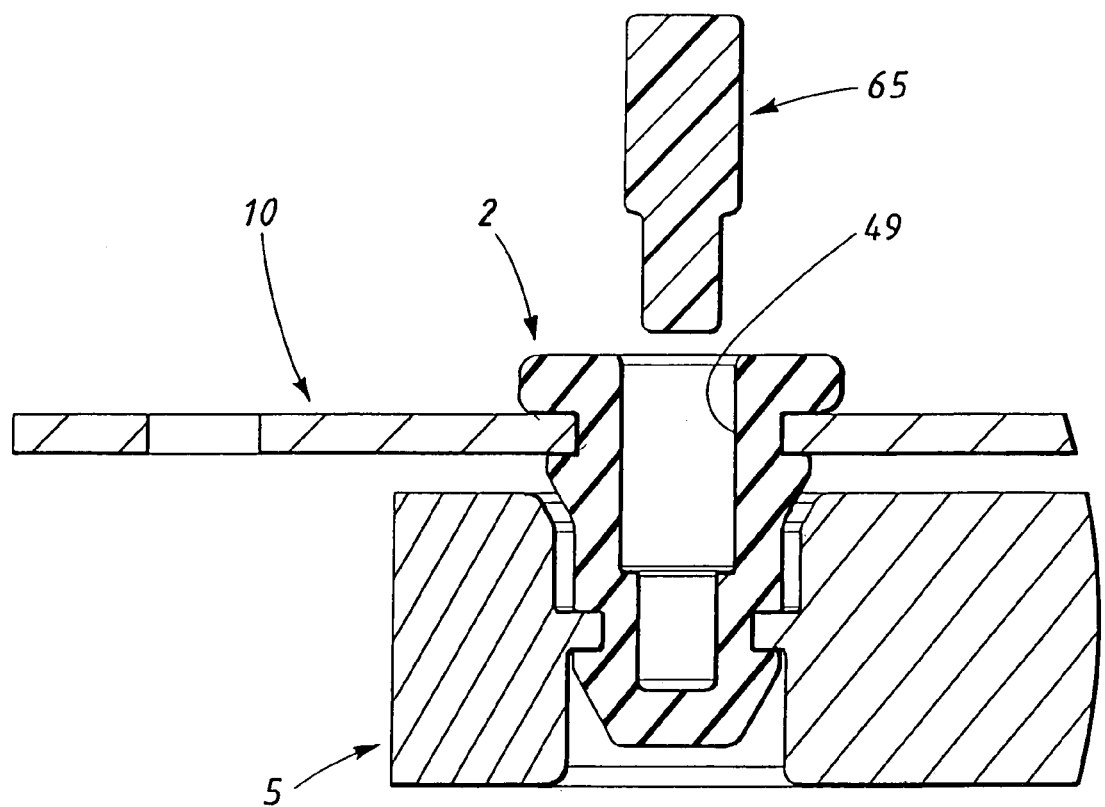
FIG. 4 is a partial view corresponding to FIG. 3 in which a non-assembled tuning core is shown.
Figure 5:
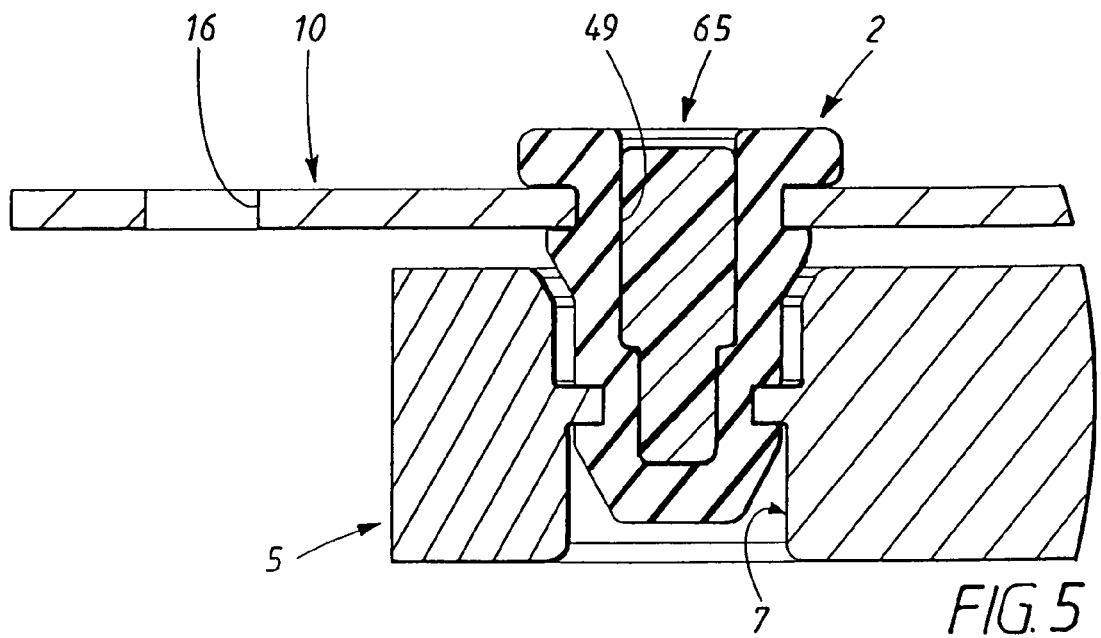
FIG. 5 shows the tuning core assembled.
Figure 6:
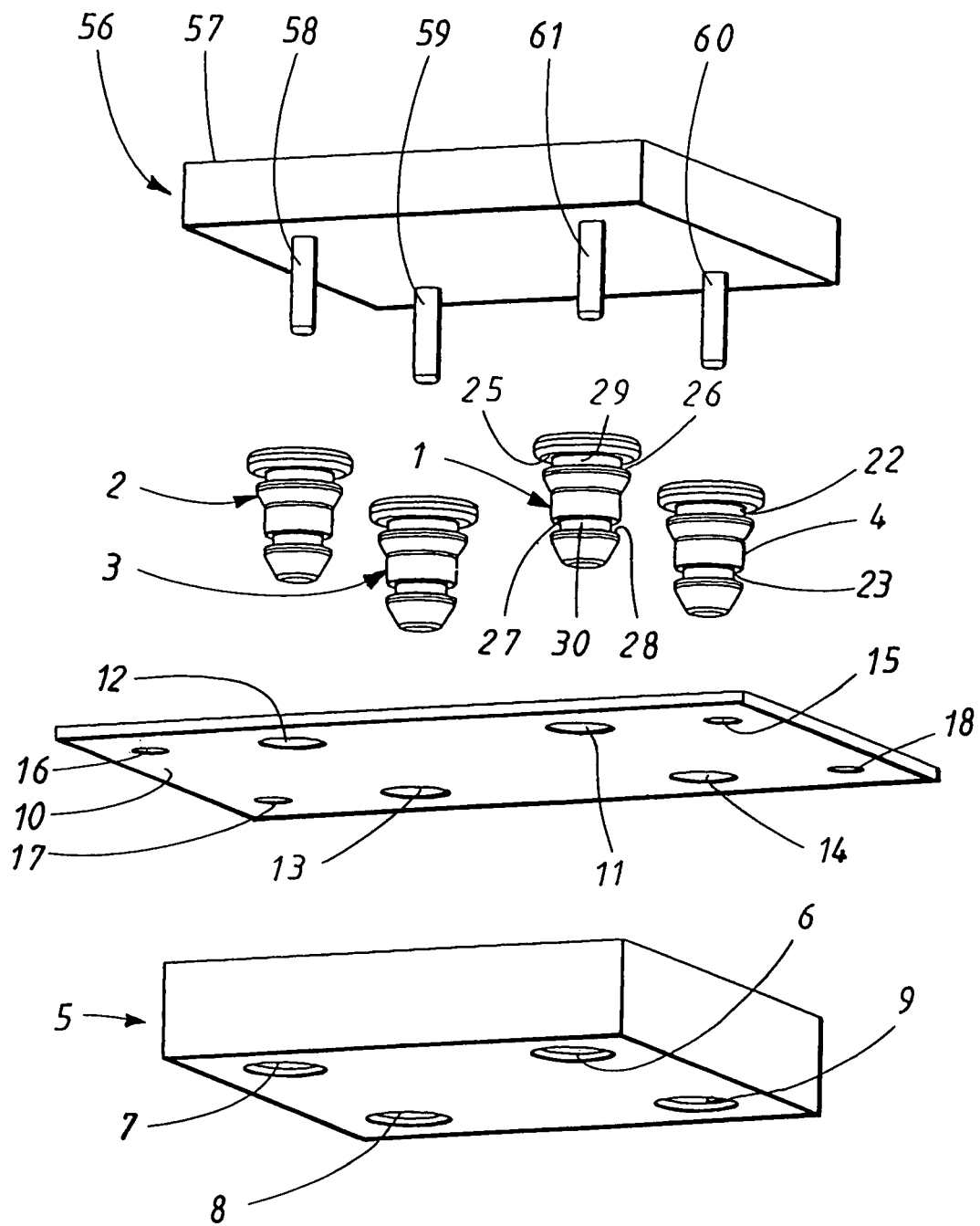
FIGS. 6-10 are perspective views of assembly techniques for the resonance damper according to an example, non-limiting embodiment.

An example of the tuning core 65 before assembly is shown in FIG. 4 and in an assembled state in FIG. 5. The core has a shape which is suited to fit into the cavity 49 (however it does not have to fill it entirely), and is chosen with a suitable hardness to affect the deformation of the damping element during the vibrations. For example, cores of various hardness can be chosen for certain of the damping elements which are comprised in a damper. The hardness can vary from a material which is softer than the material of the damping elements to a material which is harder than the damping element. The cores and also the damping elements can be comprised in a test kit of varying hardnesses and be equipped with, for example, a color code, for example coloring of the entire core and the damping elements.

FIG. 6-10 show the method for assembling the resonance damper according to the example shown, where the assembly Is done on a fastening plate before final assembly in the installation in question. A special assembly tool 56 is used for the assembly, which can best be seen in FIG. 6. The tool consists of a plate 57 with pins 58 which protrude from the plate and are arranged with an amount and positions which correspond to the amount and positions of the recesses 6-9 of the vibration body 5. The pins are dimensioned so that they can be brought into the cavities 49 of the damping elements. In order to touch bottom, the taps thus have a length which exceeds the depth of the cavities.

Figure 7:
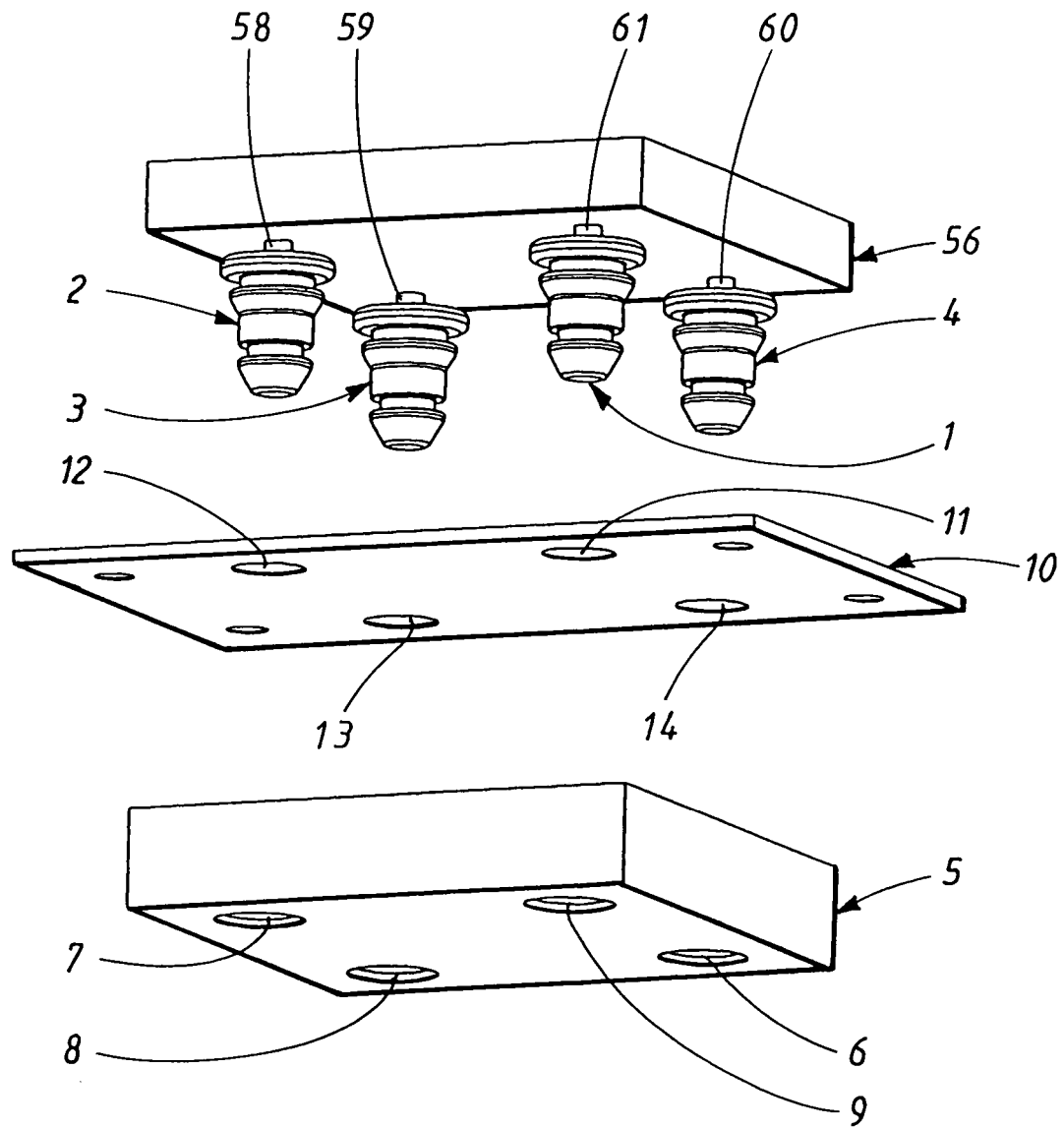
Figure 8:
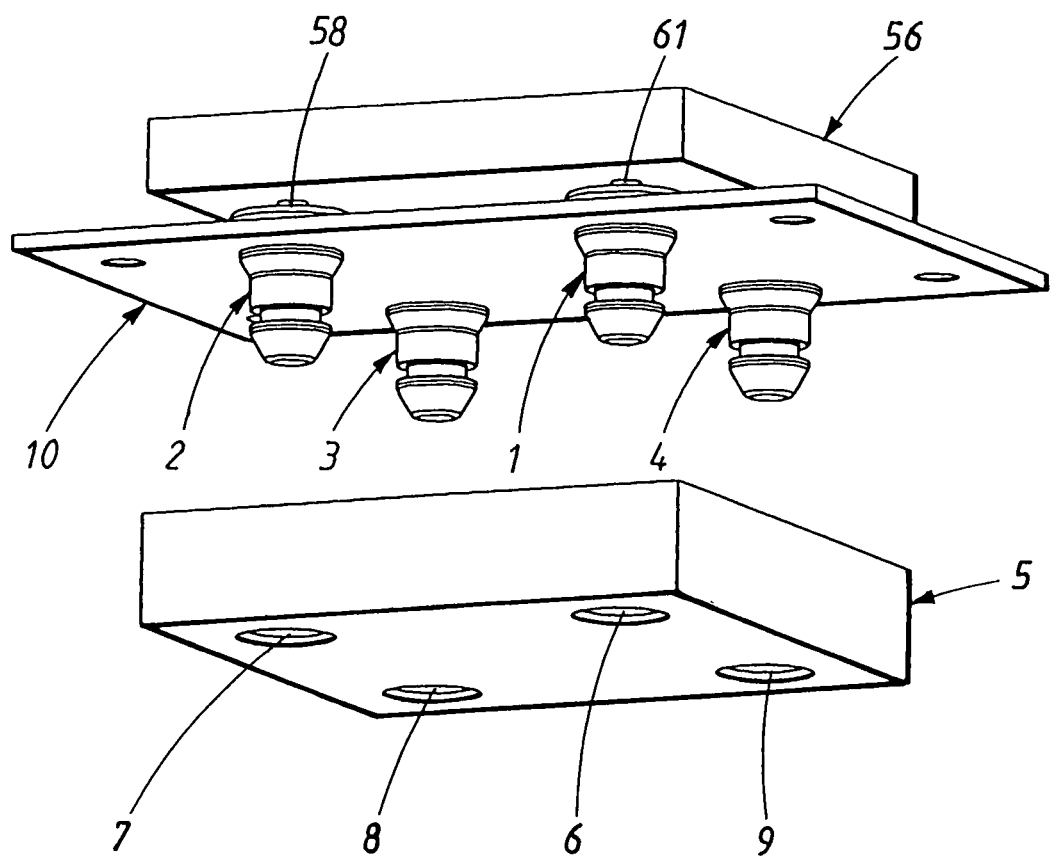

As shown in FIG. 7, the assembly is initiated by the damping elements 1-4 being fitted onto the pins 58-60, following which the tool 56 is pressed against the assembly mat 10, and is directed against the pins inwards, towards its holes 11-14. In so doing, the damping elements are pressed through the holes by means of the deformation of the damping elements until their gripping organs 22 are in position directly aligned with the edge portions 31 of the fastening plate 10. The damping elements are thus fixed to the fastening plate 10.

This first step of assembly is preferably carried out industrially, by holding the mounting plate 56 and the fastening plate 10 in their own fixtures with one being mobile towards the other in order to achieve the above described pressing together.

Figure 9:
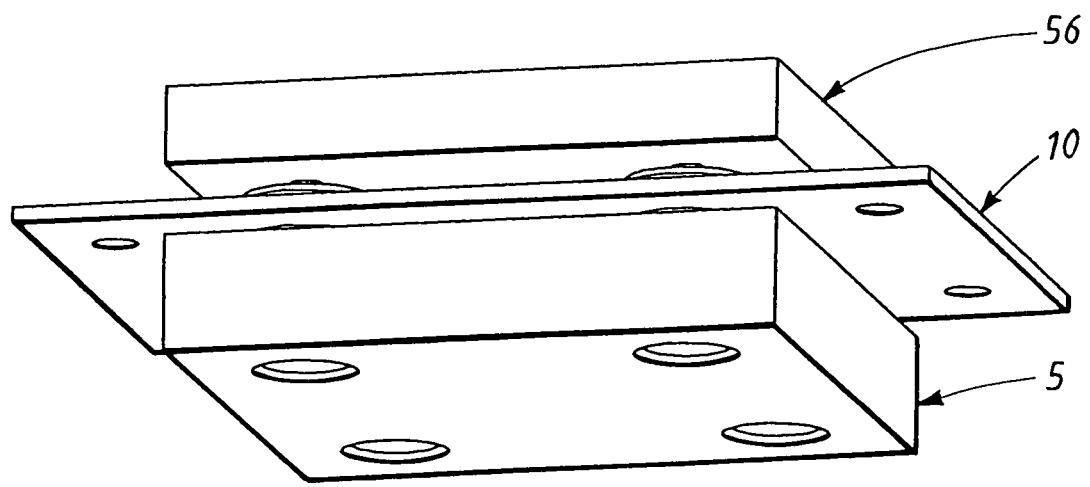

The following step of assembly consists of attaching the vibration body 5 to the damping elements 1-4. This can, in principle, take place in a step integrated with the first step with the vibration body, and the fastening plate 10 being held at a distance from each other which is obtained in the final state. The assembly can also take place in separate steps, which are shown in the figures for the sake of clarity. In so doing, the vibration body 5 is brought together with the damping elements, with the assembly tool 56 retained and used in order to create the necessary pressing force for pressing the damping elements into the recesses 6-9 of the vibration body. FIG. 9 shows the damping elements in position in the vibration body, which takes place when the gripping organ 23 of the damping elements have come into interaction with the flanges 32 of the vibration body.

Figure 10:
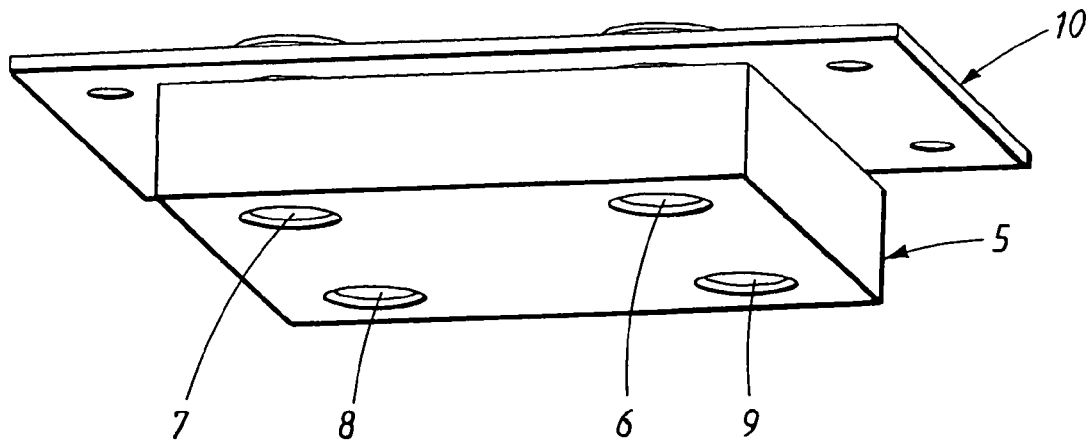

When the assembly is finished, the tool is moved and the assembled resonance damper, see FIG. 10, is ready for final assembly by fastening the fastening plate 10 to the vibration surface 21 by means of the fastening elements 19, 20 and distance elements 61, 62, see FIG. 2.

Figure 11:
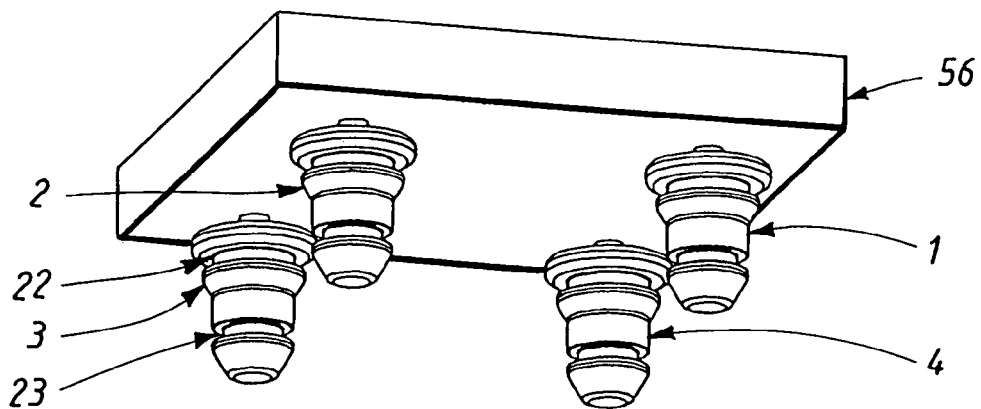
FIGS. 11-13 are perspective views of assembly techniques for the resonance damper in which a fastening plate is not used.
Figure 11:
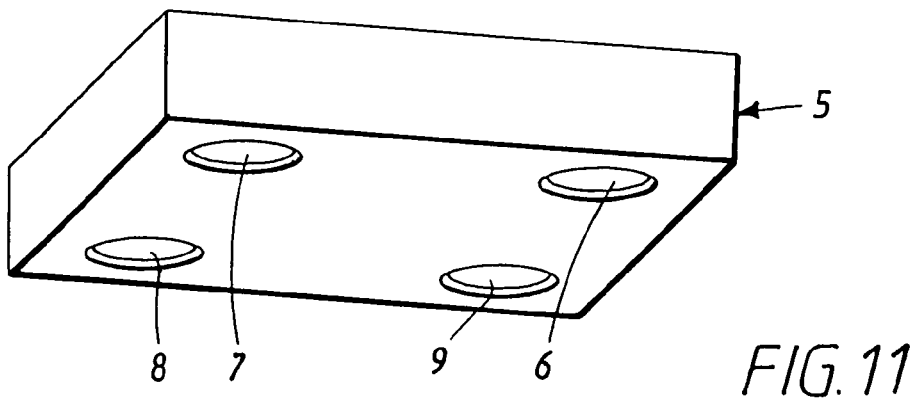
Figure 12:
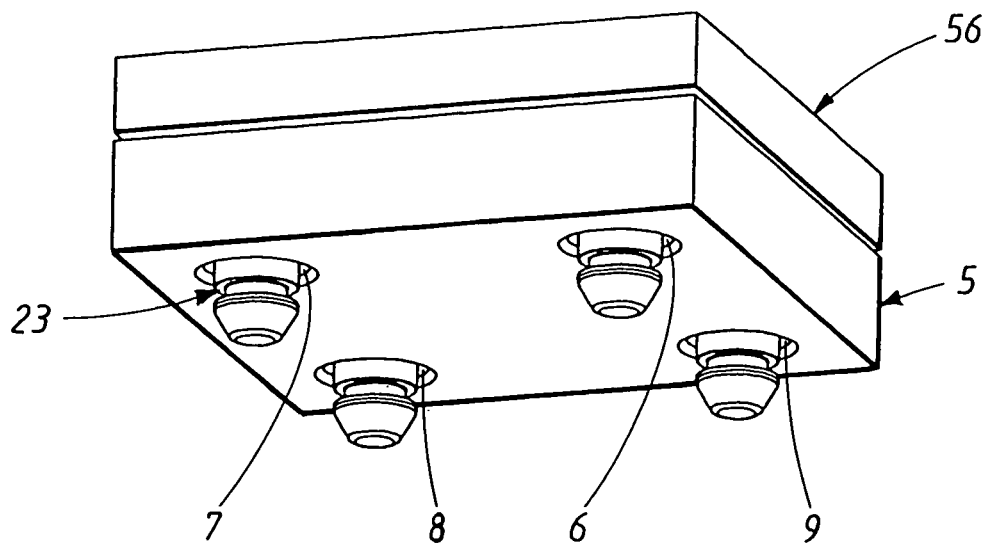
Figure 13:
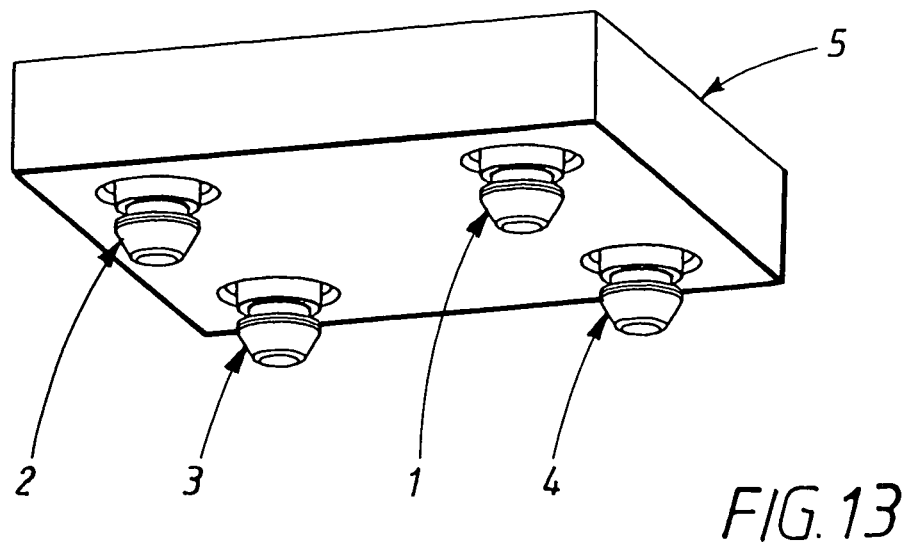

FIGS. 11-13 In principle show the same method of assembly as described above, however with the difference that a special assembly plate is not used. Thus, as earlier, the damping elements are slipped onto the pins 58-61 of the assembly tool 56, following which the damping elements by means of the tool are pressed through the recesses 6-9 in the vibration body 5. The difference compared to the previous method is that the damping elements are pressed in through the recess from the opposite side with the gripping organs 22 of the elements instead being brought into contact and interaction with the gripping organ 32 of the vibration body while the gripping organs 23 of the damping elements are brought to protrude from the recess of the vibration body and are ready for later assembly at the installation against holes made in a fastening surface in the final application, i.e. either the vibration surface or a fastening surface which is in fixed contact with the vibration surface. Suitably, the assembly tool 56 is also used during final assembly in the same way as in the case of assembly at the fastening plate 10.

FIGS. 14-17 show an alternative assembly method where the pressing mounting tool has been replaced by pulling straps 62 on each damping element. The damping elements are suitably manufactured in this case in one piece with an integrated pulling strap 62 which directly contacts the head of the damping element and is suitably slightly conical.

Figure 14:
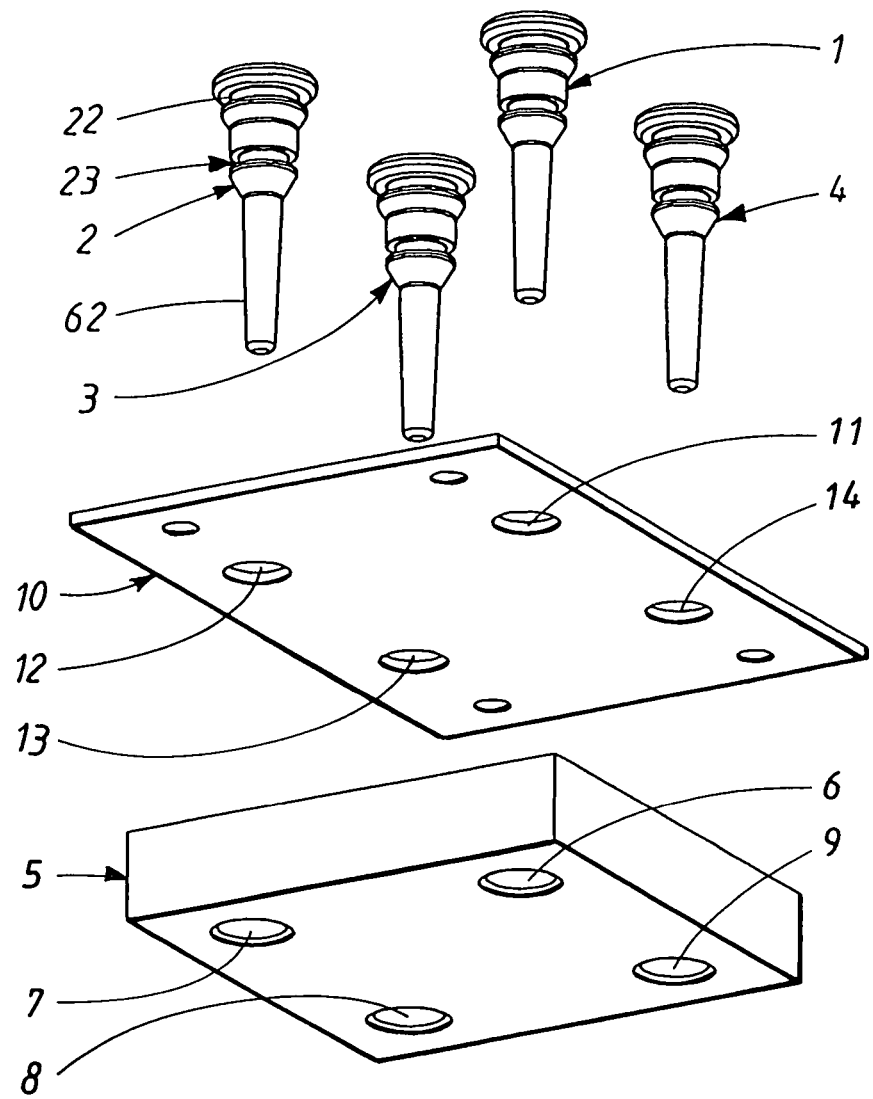
FIGS. 14-17 are perspective views of assembly techniques for the resonance damper according to another example, non-limiting embodiment.
Figure 15:
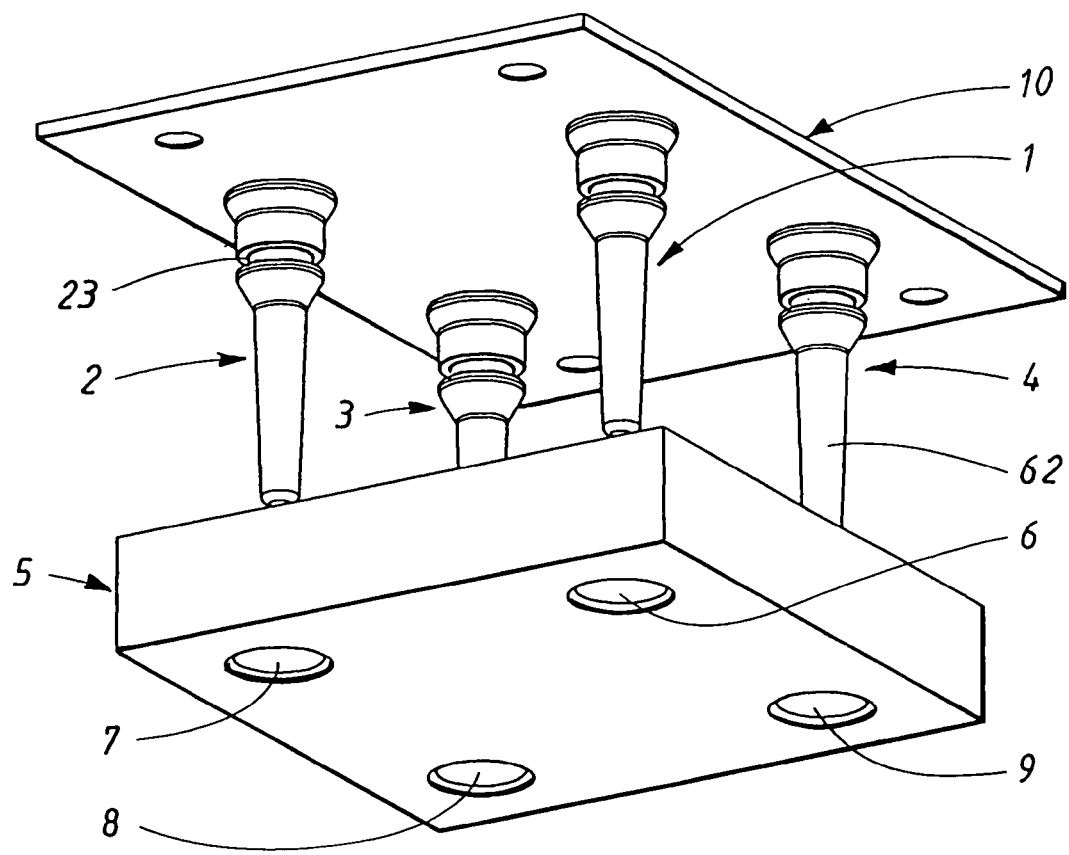
Figure 16:
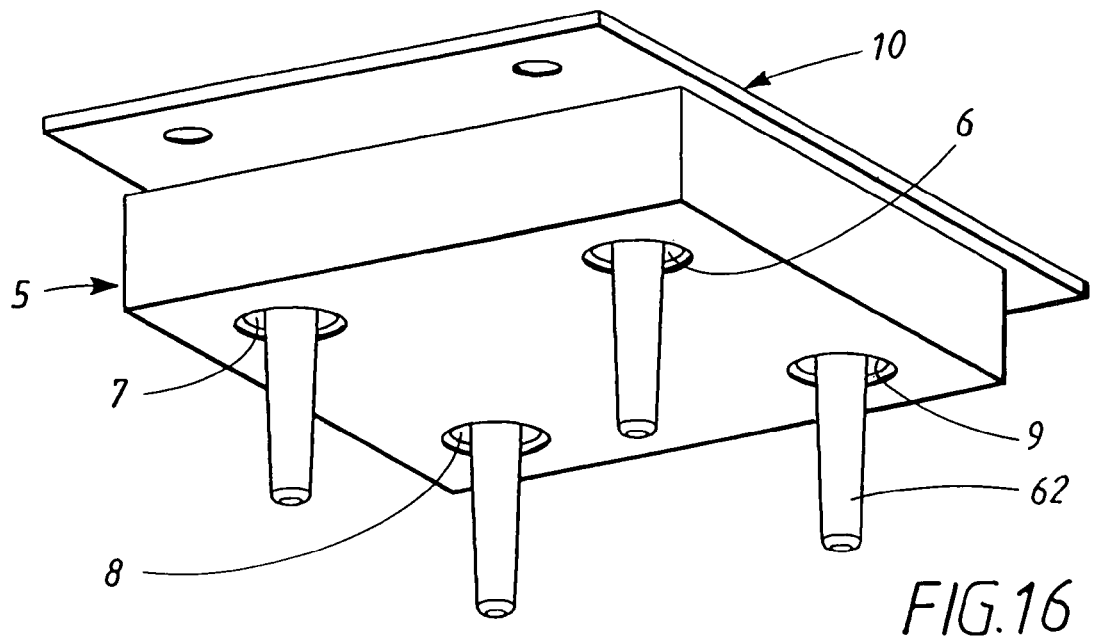
Figure 17:
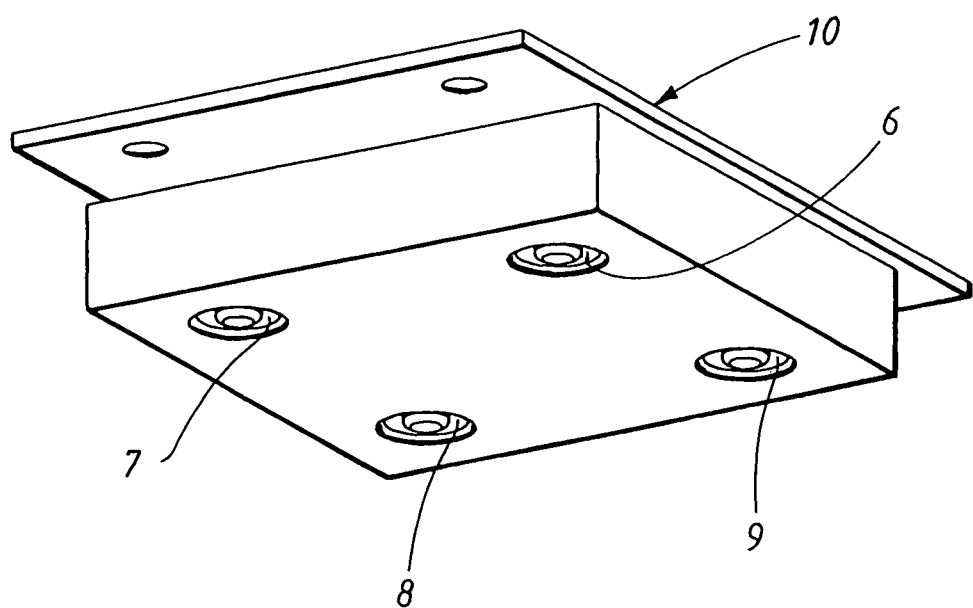
Figure 18:
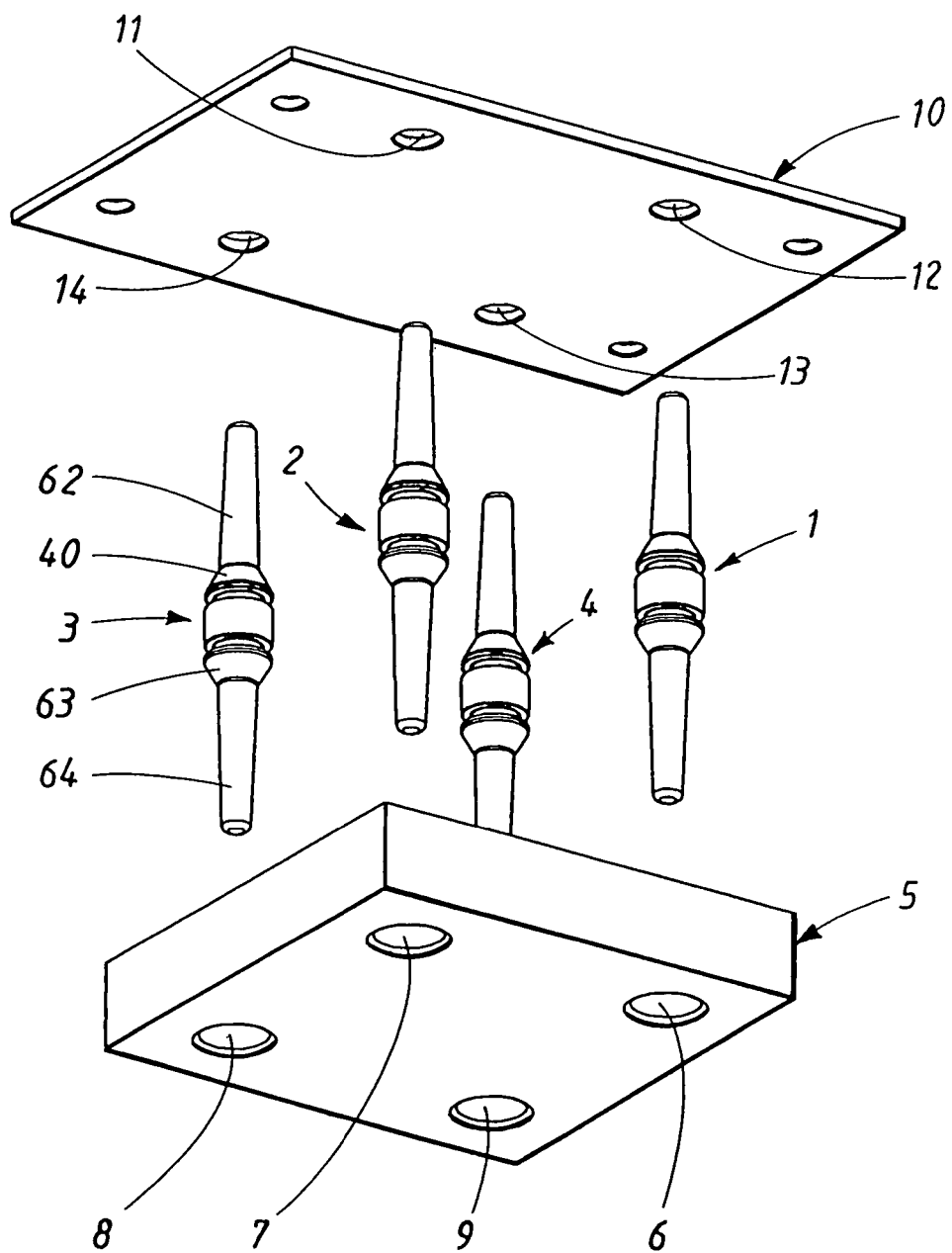
FIGS. 18-21 are perspective views of assembly techniques for the resonance damper according to another example, non-limiting embodiment.
Figure 19:
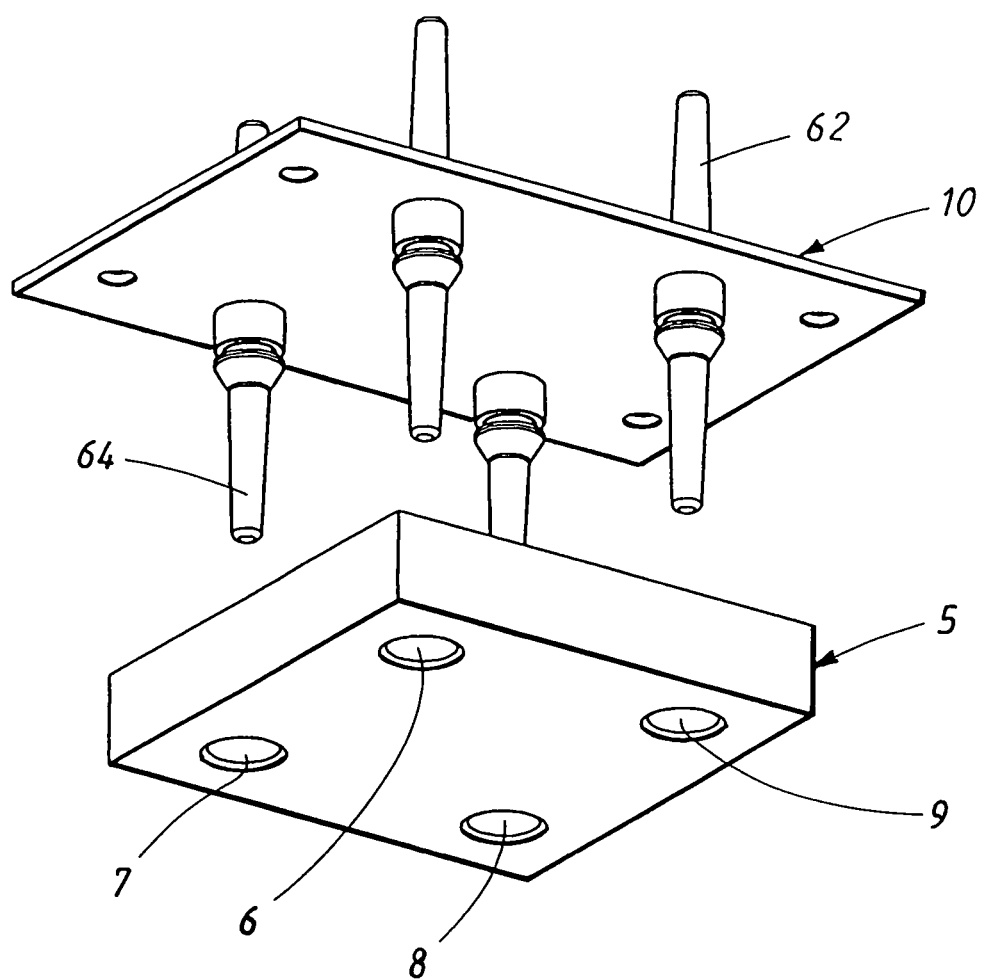
Figure 20:
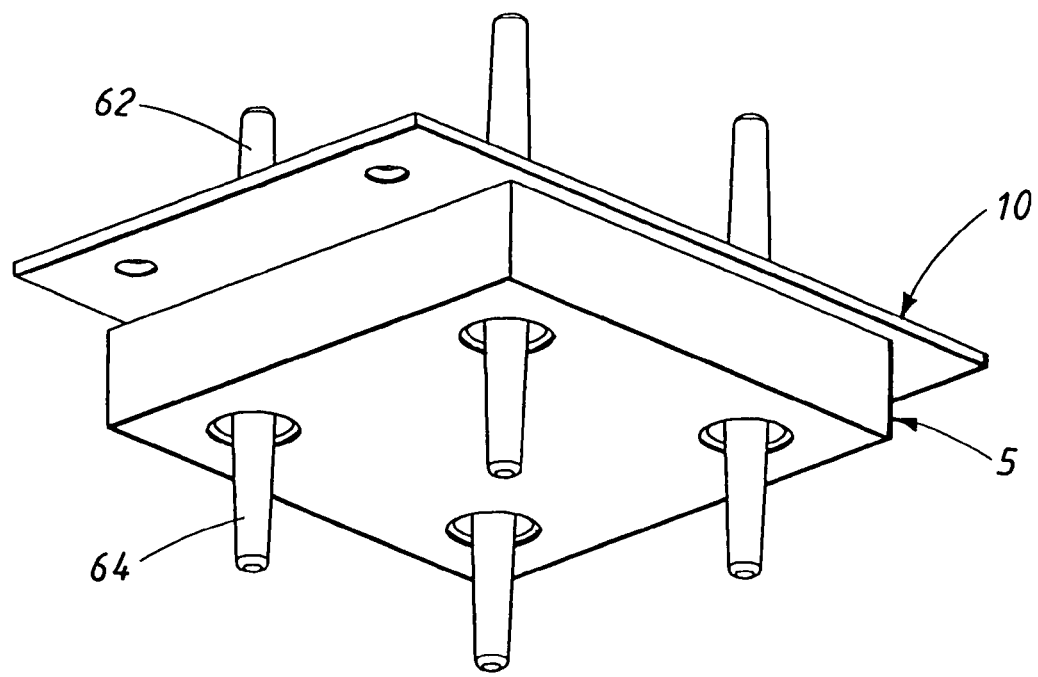
Figure 21:
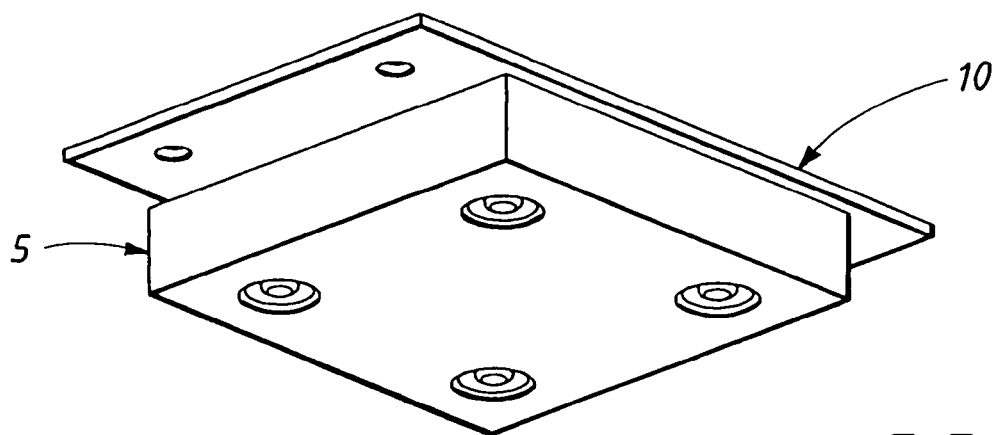

FIG. 14 schematically shows an initial position with the damping elements 1-4, the fastening plate 10 and the vibrational body 5 being separate while FIG. 15 shows the damping elements pulled through the fastening plate 10. This is simply done by first moving the pulling straps 62 through the recesses 11-14 of the fastening plate following which the pulling straps are gripped and the elements are pulled through until the gripping organs 22 of the damping elements come into interaction with the edge parties of the fastening plate 10 of the recesses 11-14, see FIG. 15. Following this, the pulling straps 62 of the damping elements are moved through the recesses 6-9 in the vibration body, and when they abut on the opposite side of the recesses, the straps are pulled either manually or by means of a tool so that the recesses 23 of the damping elements are brought into interaction with the gripping organs 32 of the vibration body 5. After assembly, the pulling straps are cut off by means of a not shown cutting tool suitably levelled with the outside of the vibration body.

FIGS. 18-21 show a version of damping elements with double conical surfaces 40, 63 facing away from each other, which become pulling straps 62, 64 which face away from each other. The damping elements are here plane between the fastening plate 10 and the vibration body 5 and pulled through the respective recess, i.e. with one pulling strap 62 through the recesses 11-14 of the fastening plate, and with the other pulling straps 64 in each damping element 1-4 through the recesses 6-9 of the vibration body 5. In a manner analogous to the previous example, both of the gripping organs of the damping elements are brought into contact with, and interaction with both the gripping organs of the fastening plate and the gripping organs of the recesses of the vibration body. Finally, both straps are cut off level with the side of the fastening plate which faces away and the side of the vibration body which faces away respectively.

The invention is not limited to the above described and in the drawings shown examples of embodiments, but can be varied within the scope of the appended claims. For example, the embodiments with pulling straps can be used in applications without a separate fastening plate. By combining damping elements 1-4 of the same damper but with different hardness and by also combining with tuning cores of different hardness, the damper can be fine tuned to a wide range of frequencies.

What is claimed is:

1. A frequency tuned resonance damper assembly, comprising:
    a plate portion with a hole, the plate portion being attached to a surface, the vibrations of which are to be dampened;
    an elastic element; and
    an elastically suspended mass, the mass being elastically suspended from the plate portion by the elastic element and having a holding member, the elastic element having tapered sidewalls, the elastic element including a first gripping member and a second gripping member, the elastic element being inserted into the hole so that
    the first gripping member engages with the hole in the plate portion,
    the second gripping member engages with the holding member of the elastically suspended mass, and
    the elastic element tapers at a location between the plate portion and the elastically suspended mass,
    wherein the elastic element and the elastically suspended mass are tuned so that vibrations of the surface are counteracted though phase-shifted movement of the elastically suspended mass.

2. The assembly of claim 1, wherein the elastic element includes a conical surface between the first gripping member and the second gripping member.

3. The assembly of claim 2, wherein the elastically suspended mass includes a recess and the recess of the elastically suspended mass includes a conical portion opposite the conical surface of the elastic element.

4. A frequency tuned resonance damper assembly, comprising:
a plate portion with a hole, the plate portion being attached to a surface, the vibrations of which are to be dampened;
an elastic element; and
ab elastically suspended mass, the mass being elastically suspended from the plate portion by the elastic element and having a holding member, the elastic element having tapered sidewalls, the elastic element including a first gripping member and a second gripping member, the elastic element being inserted into the hole such that the first gripping member engages with the hole in the plate portion and the second gripping member engages with the holding member of the elastically suspended mass, the elastic element having a first end that is open, and the elastic element having a cavity that extends from the first end along a longitudinal axis of the elastic element and the cavity is empty after the first gripping member engages the hole and the second gripping member engages the holding member,
wherein the elastic element and the elastically suspended mass are tuned so that vibrations of the surface are counteracted through the phase-shifted movement of said elastically suspended mass.

5. The assembly of claim 4, wherein the elastic element has a closed end such that the cavity does not extend entirely through the elastic element.

6. The assembly of claim 4, wherein the cavity has a first diameter at the first end and a second diameter between the first end and an end of the cavity.

7. The assembly of claim 6, wherein the first diameter is greater than the second diameter.

8. The assembly of claim 4, wherein the longitudinal axis is a central axis of the elastic element.

9. A frequency tuned resonance damper assembly, comprising:
a plate portion with a hole, the plate portion being attached to a surface, the vibrations of which are to be dampened;
an elastic member; and
an elastically suspended mass, the mass being elastically suspended from the plate portion by the elastic element and having a holding member the elastic element having tapered sidewalls, the elastic element being inserted into the hole, the elastic element including:
a first gripping member engaging the hole in the plate portion; and
a second gripping member having a recessed portion, the second gripping member engaging the holding member such that the holding member completely fills the recessed portion,
wherein the elastic element and the elastically suspended mass are tuned so that vibrations of the surface are counteracted though phase-shifted movement of the elastically suspended mass.

10. The assembly of claim 9, wherein holding member has an upper surface and a lower surface, and
wherein the recessed portion of the second gripping member has a first surface that extends substantially parallel to the upper surface and a second surface that extends substantially parallel to the lower surface.

11. The assembly of claim 10, wherein the second gripping member has a u-shaped groove when viewed in cross-section defined by the first surface, the second surface and a third surface extending between the first surface and the second surface.

12. The assembly of claim 10, wherein the second gripping member includes a pair of annular members, each annular member having one of the first and second surfaces.

13. The assembly of claim 10, wherein the upper surface and lower surface are substantially parallel.

14. The assembly of claim 10, wherein the first surface is substantially parallel to the second surface.

15. The assembly of claim 9, wherein the second gripping member includes a pair of annular members and the recessed portion is formed between the annular members.

16. The assembly of claim 1, wherein the elastically suspended mass includes a recess,
wherein the holding member is provided in the recess, and
wherein the elastic element is inserted into the recess.

17. The assembly of claim 4, wherein the elastically suspended mass includes a recess,
wherein the holding member is provided in the recess, and
wherein the elastic element is inserted into the recess.

18. The assembly of claim 9, wherein the elastically suspended mass includes a recess,
wherein the holding member is provided in the recess, and
wherein the elastic element is inserted into the recess.

19. A frequency tuned resonance damper assembly, comprising:
a plate portion with a hole, the plate portion being attached to a surface, the vibrations of which are to be dampened;
an elastic element; and
an elastically suspended mass, the mass being elastically suspended from the plate portion by the elastic element and having a holding member, the elastic element being rotationally symmetric along a longitudinal axis and having tapered sidewalls, the elastic element including a first gripping member and a second gripping member, the elastic element being inserted into the hole so that the first gripping member engages with the hole in the plate portion in a tight fit which is continuous along the longitudinal axis, the second gripping member engaging with the holding member of the elastically suspended mass in a tight fit which is continuous along the longitudinal axis, the damping element tapering at a location between the plate portion and the elastically suspended mass, and the damping element having a cavity that extends from a first end along the longitudinal axis of the damping element the cavity, the cavity comprising two cylindrical portions with different diameters,
wherein the elastic element and the elastically suspended mass are tuned so that vibrations of the surface are counteracted though phase-shifted movement of the elastically suspended mass.

20. The assembly of claim 19, wherein the holding member has an upper surface and a lower surface, and
wherein the second gripping member has a first surface that extends substantially parallel to the upper surface and a second surface that extends substantially parallel to the lower surface.

21. The assembly of claim 20, wherein the second gripping member has a u-shaped groove when viewed in cross-section defined by the first surface, the second surface and a third surface extending between the first surface and the second surface.

22. The assembly of claim 20, wherein the second gripping member includes a pair of annular members, each annular member having one of the first and second surfaces.

23. The assembly of claim 20, wherein the upper surface and lower surface are substantially parallel.

24. The assembly of claim 20, wherein the first surface is substantially parallel to the second surface.

25. The assembly of claim 19, wherein the elastically suspended mass includes a recess,
   wherein the holding member is provided in the recess, and
   wherein the damping element is inserted into the recess.

\* \* \* \* \*